June 30, 1959  A. G. HIEBERT  2,892,474
AUTOMATIC CUT-OFF STOP FOR POWER SAWS
Filed July 25, 1958
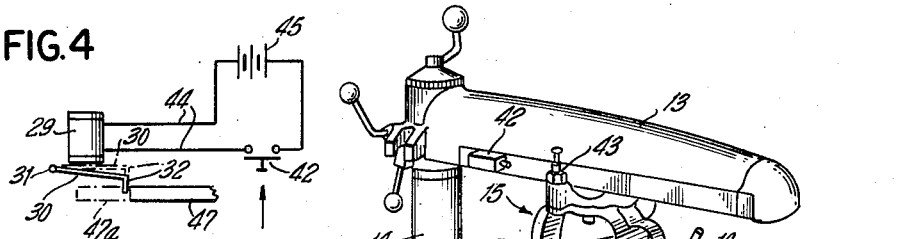
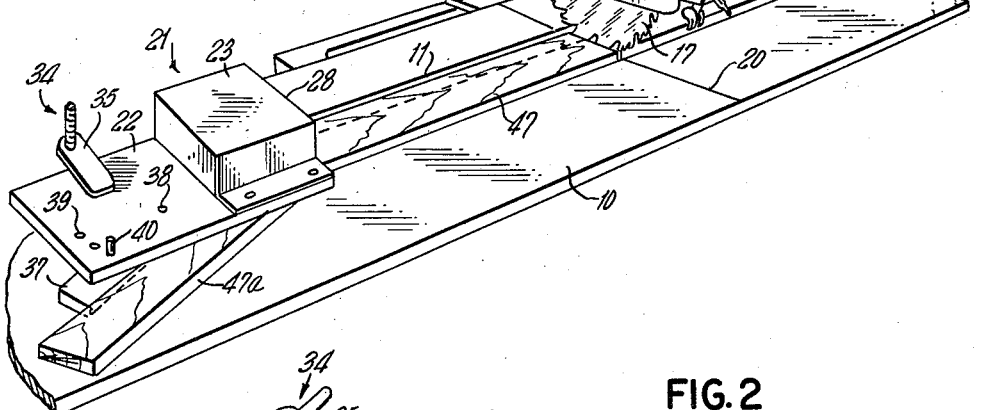
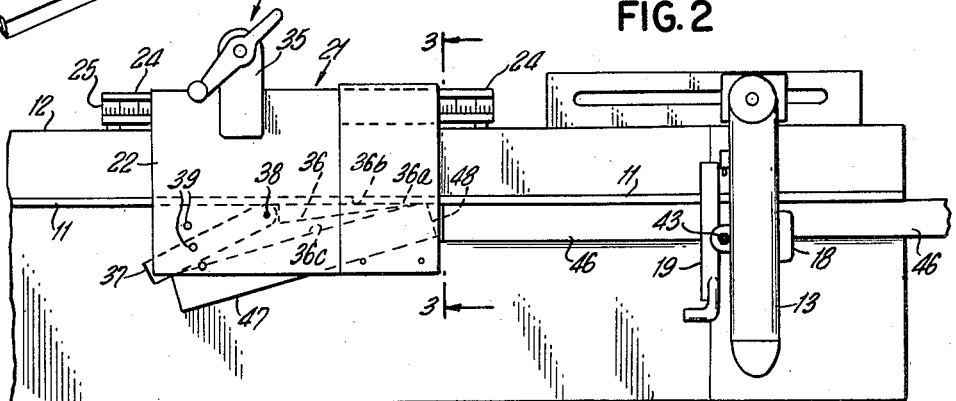
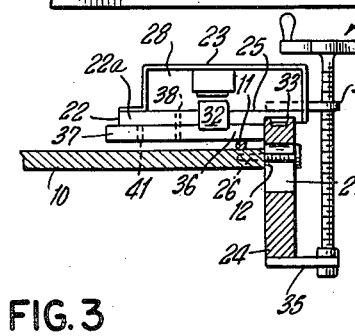
INVENTOR.
ABRAHAM G. HIEBERT
BY
F. Ledermann
ATTORNEY

United States Patent Office 2,892,474
Patented June 30, 1959

2,892,474
AUTOMATIC CUT-OFF STOP FOR POWER SAWS
Abraham G. Hiebert, Santa Cruz, Calif.

Application July 25, 1958, Serial No. 750,920

8 Claims. (Cl. 143—168)

This invention relates to automatic cut-off stops for power saws, and the main object is the provision of a new and improved stop applicable to all conventional types of power saws which are worked in conjunction with a table on which the material to be sawed through is supported. The automatic stop of the present invention is applicable to wood sawing and also to the sawing of any other materials which can be handled on such machines.

The present cut-off stop is used on such machines wherein it is desired to cut or saw a long work piece into pieces of equal length, the stop being clamped to the table at a distance from the saw blade equivalent to the desired length of the pieces to be cut off. The present stop, when installed, results in a speed-up of production beyond comparison with conventional stops. Further, the danger of the operator's being cut by the saw is practically completely eliminated, because the hand working the cut-off saw never leaves the handle of the machine while in actual operation, the other hand being available to feed the material as required without coming near the saw.

Another object of the invention is the provision of an automatic cut-off stop which stops the end of the material being sawed, such as lumber, until the material has been sawed through and which is then automatically actuated to rise clear of the material to permit discharge of the cut-off piece during the feeding of the stock. Means is provided to divert the cut-off piece at an angle as it is being pushed out of the way by the advancing stock, and means is further provided for varying the degree of the said angle.

The above broad as well as additional objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details of construction shown or described except insofar as they may be deemed essential to the invention.

Referring briefly to the drawing,

Fig. 1 is a fragmentary top perspective view of a power saw equipped with the automatic cut-off stop of the present invention.

Fig. 2 is a top plan view of the same.

Fig. 3 is a sectional view taken on the line 3—3 of Fig. 2.

Fig. 4 is a wiring diagram.

Fig. 5 is a fragmentary rear elevational view of the table, with the graduated top member secured thereto.

Referring in detail to the drawing, the numeral 10 indicates the top or table panel of a power saw, the table having, as is customary, a guide ridge 11 near but spaced from the rear edge 12 thereof. As is usual in such machines, an arm 13 is pivotally mounted above the table on a column 14. A motor and saw carriage indicated generally at 15 is slidably suspended from the under side of the arm 13 in the usual manner and by means of a handle 16, or otherwise, the entire carriage is moved back and forth along the arm. The rotary saw 17 is driven by the motor 18 and is covered by a shield 19 forming part of the carriage 15. A transverse slot 20 extends through or into the table in the plane of the saw 17 when the latter is upright, which it normally is except when it has been tilted at an angle to cut material at that angle. As is well known, such machines have means for tilting the saw at an angle, but since such means are conventional they are not illustrated or described, since they are irrelevant to the present invention.

The automatic cut-off stop is indicated generally by the numeral 21 and includes a base 22 having a housing 23 on the forward end thereof, that is, the end, when the device is mounted as shown in Fig. 1, which faces toward the saw.

Secured in a vertical plane to the back edge of the table 10 is a panel or board 24 having a longitudinal groove 25 whose base is graduated in units of length, such as inches and fractions thereof. By means of bolts 26 extending outward from the table and vertical slots 27 in the panel 24, the panel is vertically adjustable with respect to the table to position its top edge at the desired level for the automatic stop to accommodate it to the thickness of the material, such as lumber, to be cut.

The housing 23 has its front end 28 wholly or partly open. An electro-magnet 29 is mounted within the housing and has an armature 30 pivoted at 31, adapted to be swung upward against the magnet core upon energization of the electro-magnet, and to descend by gravity upon de-energization. The free end of the armature has a downwardly extending tongue 32, making the armature L-shaped. In the de-energized state of the magnet with the armature released, it rests on the front end 22a of the base 22. The front end 22a of the base lies in a common vertical plane with the front end of the housing 23, shown at 28, so that the armature tongue 32 thus extends downward over the front end 22a of the base. The length of this is only slightly greater than the thickness of the base 22, so that its lower extremity in the released position of the armature extends downward over the base 22 a short distance, perhaps only a third or a half of the thickness of the base.

The base 22 has a longitudinal groove 33 in its underside near the rear edge thereof, and it is slidably mounted on the top edge of the panel 24 with the latter registering in the groove 33. Any type of clamp 34 is used to clamp the base 22 firmly in any longitudinal position with respect to the panel 24, at the proper distance from the saw for the length of cut-off piece of lumber desired.

A tapering piece of material, or member, 36, having vertical sides, is secured rigidly against the underside of the member or base 22 with its tapered extremity 36a facing toward the saw and with one flat side 36b lying in the vertical plane of the guide ridge 11 of the table 10. A second slender member 37 having opposed vertical sides is pivoted at one end to the base 22 on a pivot 38, so that its front end is substantially continuous with the rear end of the member 36. Both the members 36 and 37 may be termed "deflector" members. An arcuate series of holes 39 is provided through the base 22 and a single hole 41 in the member 37, the latter being adapted to be aligned, by moving it on its pivot, with any one of the holes 39, and by inserting a pin 40 through the aligned holes the member 37 is fixed in position.

An electric switch 42, which is illustrated as a push-button switch although it may be of any other suitable type, is fixed to the side of the arm 13 of the machine, in the longitudinal path of a projection 43 on the carriage 15 which therefore moves back and forth with the movement of the carriage. The switch 42 is positioned at or near the rearward limit stop position, not shown, of the carriage. The projection 43 may be the standard set screw of the machine for locking the carriage in normal vertical position, or it may be especially provided thereon. Leads 44 in a cable or the like, not shown, connect with the electromagnet through a source of electric supply 45 and the switch 42 in a simple circuit such as illustrated in Fig. 4. It is apparent that when the carriage is pushed rearward with respect to the arm 13, as is done by the operator in sawing through a piece of material such as a piece of lumber 46, when the carriage reaches the position wherein the projection 43 pushes the button switch into closed position, the electro-magnet will be energized so that the armature 30 will be raised.

In use, the distance at which the stop 21 is positioned from the saw line 20 is determined by the length of the pieces desired to be cut from the lumber 46, as provided for by the graduated groove 25. The piece of lumber 46 is then pushed or positioned with one edge against the guide ridge 11, the saw carriage having first been pulled forward to enable the lumber to pass between the saw and the ridge 11. The panel 24 has meanwhile been positioned vertically so that the bottom edge of the base 22 lies in the plane of the top edge of the lumber. With the armature 30 thus released, its tongue 32 will project below the bottom surface of the base 22 and hence lie in the path of the lumber 46 as it is pushed to the left, Fig. 1, and provide a stop for it at the desired position.

With the saw motor energized, the carriage 15 is pushed back along the arm 13 so that the saw cuts off the desired length of piece 47 and when this has been done a slight additional backward movement of the carriage will bring the projection 43 into actuating position with respect to the switch 42, thus energizing the latter and raising its armature so that the tongue 32 clears the top surface of the sawed off section 47. With the armature thus raised, the lumber 46 is moved a very slight distance to the left and again withdrawn to the right of the line 20. In moving it to the left, the left-hand end of the piece 47 will have passed under the tongue 32. Then the saw carriage is pulled forward again to its beginning position and the lumber 46 is again moved to the left. Owing to the angular displacement of the outer side or surface 36c of the deflecting member 36, as well as owing to the deflector 37, this will cause the cut off piece 47 to be deflected into the position shown at 47a. When the right-hand end of the piece 47 reaches the position thereof indicated by the piece 47a, an angular space 48 will be created between the adjacent left-hand end of the lumber 46 (Fig. 2) and the cut-off piece 47, into which the tongue 32 will fall after having ridden over the cut-off piece 47, thus serving as an automatic stop to the advancing lumber and insuring that the next piece to be cut off will have the same length as the previously cut piece.

The sequence and manner of the steps performed by the operator need not necessarily be exactly as described above; the essential is that the cut off piece be moved to the left a sufficient distance, and that is very small, to position its left-hand end under the tongue 32 so that it will ride on the piece so that it may drop into the space 48.

By the aid of the automatic cut-off stop thus described, it is obvious that the speed of operation in cutting a length of material into sections of equal length is greatly increased, with practically complete elimination of danger to the operator.

The adjustability of the angular displacement of the cut off piece by means of the pivoted deflector member 37 permits of making the space 48 sufficiently large in the case of a narrow piece of lumber, and also permits of deflecting it at a large or smaller angle accordingly as it is desired to have the cut off pieces moved off the table more or less rapidly.

The invention having thus been described, what is claimed and desired to be secured by Letters Patent, is as follows:

1. In combination with a power saw machine which includes a table having a longitudinal guide ridge near and parallel with the rear edge of the table and a saw-carrying arm extending over the table in a generally transverse direction wherein a saw-holding carriage is slidably mounted in the arm and adapted to be slid longitudinally with respect to the arm, a vertical panel secured to the back of the table with the top edge of the panel horizontal and elevated above the table, an automatic cut-off stop comprising a base, an electro-magnet mounted on the base and having an armature adapted to be raised upon energization thereof and to fall by gravity to a lowered position, the armature including a downwardly extending tongue adapted in said lowered position thereof to extend downward over the adjacent end of the base and to extend a distance therebeyond, the base having a longitudinal groove near one side thereof in the bottom thereof and being slidably mounted on said panel with the top of the panel registering in the groove, a tapering deflector member secured to the underside of the base on the opposite side thereof with the tapering end facing toward said one end of the base and having vertical sides, that one of said deflector sides facing toward said groove being parallel with the groove and spaced therefrom a distance substantially equal to the distance between said panel and said side of said ridge, means for releasably locking the base on the panel, a projection on said carriage, a switch mounted on said arm near the rearward end of travel of said carriage, said switch lying in the path of travel of said projection, and means for energizing the electro-magnet upon impact of the projection with the switch.

2. The combination set forth in claim 1, said base having a second deflector member pivoted thereto at one end thereof close to the wide end of the first deflector in the plane of the latter and extending outward from the base at an angle to the first deflector member, and means for releasably locking the second deflector member in any of a plurality of angular positions with respect to the first deflector member.

3. The combination set forth in claim 2, having adjustable means for varying the elevation of said panel.

4. The combination set forth in claim 1, having adjustable means for varying the elevation of said panel.

5. The combination set forth in claim 4, said last-named means comprising spaced bolts on the table, the panel having spaced slots therein having said bolts registering slidably in the slots.

6. An automatic cut-off stop for a power saw machine which includes a table and a longitudinal ridge against which a piece of material is adapted to be positioned to be sawed into sections of a given equal length, the stop having means for releasably locking the same to the table at a distance from the saw equal to said given length, the stop including a tongue normally falling by gravity toward the table in the path of the piece of material as it is moved along said ridge to serve as a stop for the piece of material, means for raising said tongue above the top of said piece upon completion of the saw cut therethrough, means for deflecting the cut off length of material at an angle to said piece during further movement of the piece in the same direction along said guide, said first-named means including means for releasing the tongue to fall by gravity as aforesaid.

7. An automatic cut-off stop according to claim 6, including means for releasably locking the same at any of a plurality of vertically spaced positions above the table.

8. An automatic cut-off stop according to claim 6, including means for increasing the angle of deflection of the cut off length of material during said further movement of the piece of material.

References Cited in the file of this patent

UNITED STATES PATENTS

| 1,800,382 | Grant | Apr. 14, 1931 |
| 2,526,626 | Basso | Oct. 24, 1950 |
| 2,850,058 | Stoll | Sept. 2, 1958 |